(No Model.) 3 Sheets—Sheet 1.

J. RIDDELL.
PATH DELINEATING, RECORDING, AND MEASURING MACHINE.

No. 589,030. Patented Aug. 31, 1897.

WITNESSES.
A. Macdonald.
B. B. Hull.

INVENTOR.
John Riddell
By E. W. Carly
Atty

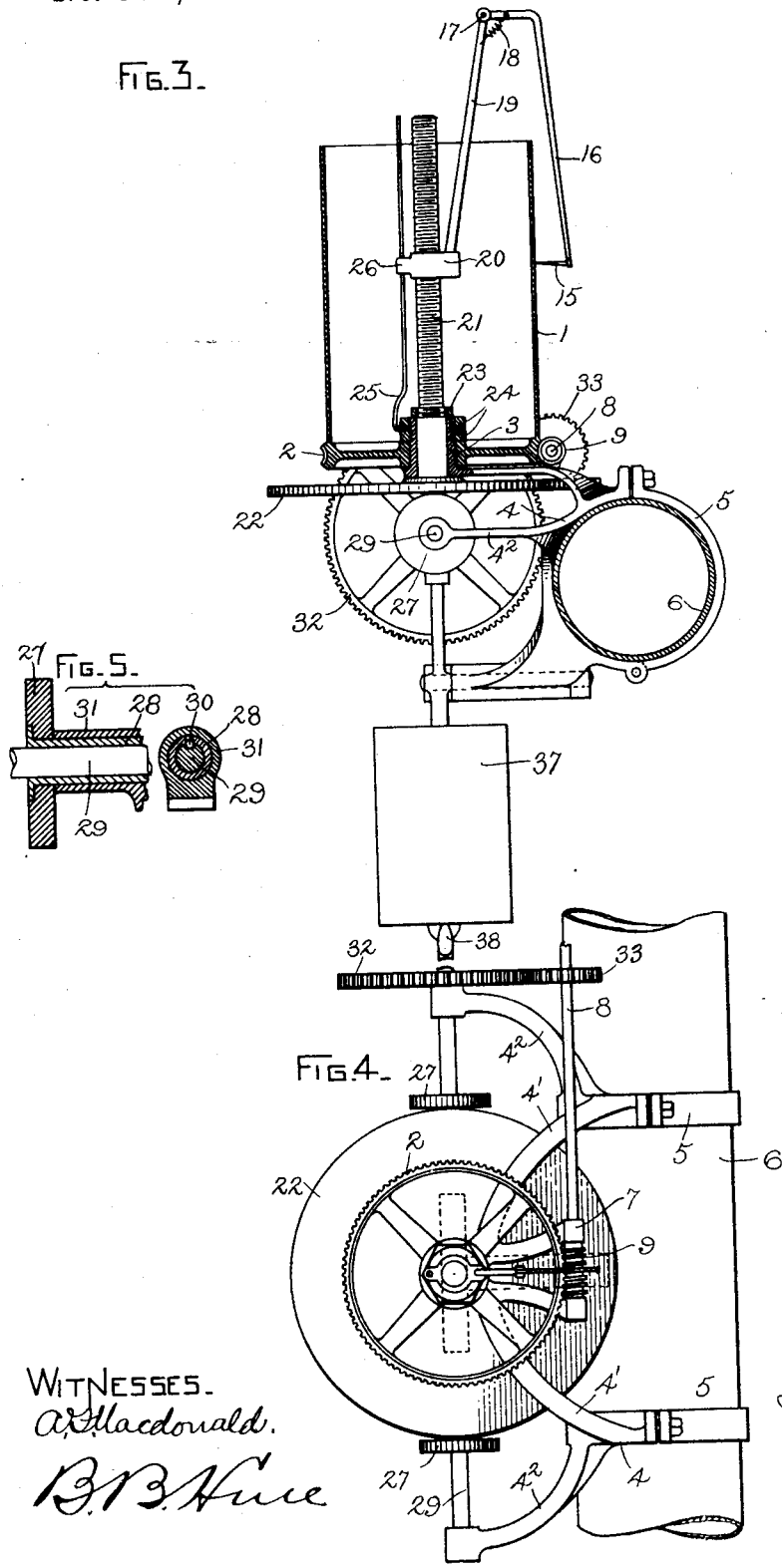

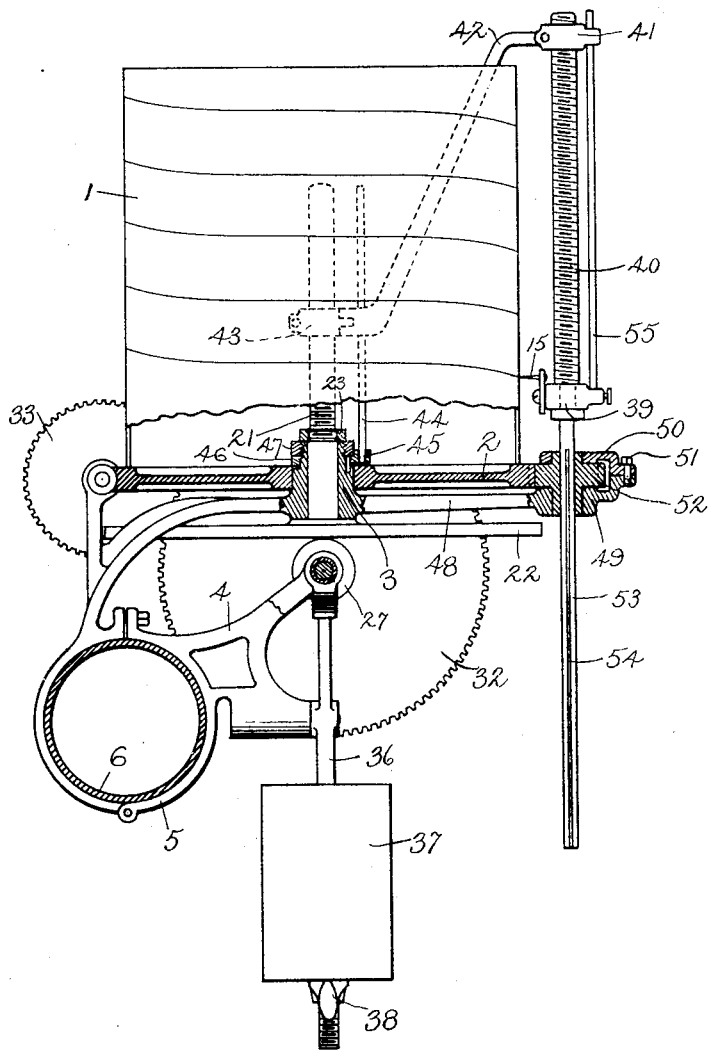

UNITED STATES PATENT OFFICE.

JOHN RIDDELL, OF SCHENECTADY, NEW YORK.

PATH DELINEATING, RECORDING, AND MEASURING MACHINE.

SPECIFICATION forming part of Letters Patent No. 589,030, dated August 31, 1897.

Application filed September 23, 1896. Serial No. 606,754. (No model.)

*To all whom it may concern:*

Be it known that I, JOHN RIDDELL, a citizen of the United States, residing at Schenectady, county of Schenectady, State of New York, have invented a new and useful Path Delineating, Recording, and Measuring Device, of which the following is a specification.

The invention broadly contemplates a portable device or apparatus which in traveling from one point to another on the earth's surface will delineate the path or course as it is pursued and not only records the outline of the path over plane and irregular surfaces, from which the distance traveled over may be measured.

This apparatus may be attached to any suitable vehicle, so as to be driven or operated as the vehicle moves, or may be moved by hand in any way desired over the solid surface which is to be outlined.

The invention embraces in its general features a device, such as a cylinder or disk or other suitable support, with a surface or covering on which the path traversed is to be delineated, a marker bearing against said recording surface or covering and adjusted to mark the outline or delineation intended, and mechanism connected with the recording surface and marker by means of which the delineation is effected.

Various ways of carrying out and applying this invention may be employed and the apparatus can be constructed in different forms.

To illustrate one way of applying the invention, it is shown as used with a bicycle.

The invention consists of an apparatus for delineating the outline of a path or course traveled over a solid surface from one point to another and recording and measuring the distance traveled, as hereinafter set forth and claimed.

Figure 1:
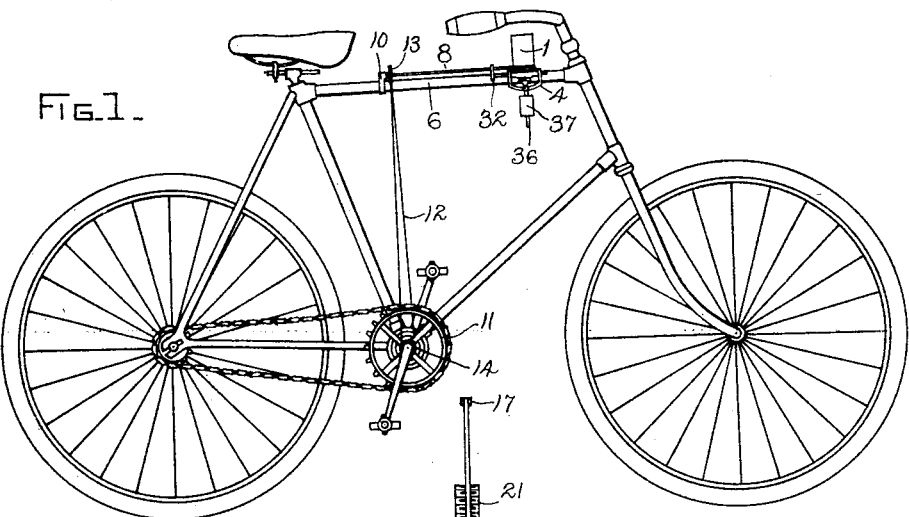
Figure 2:
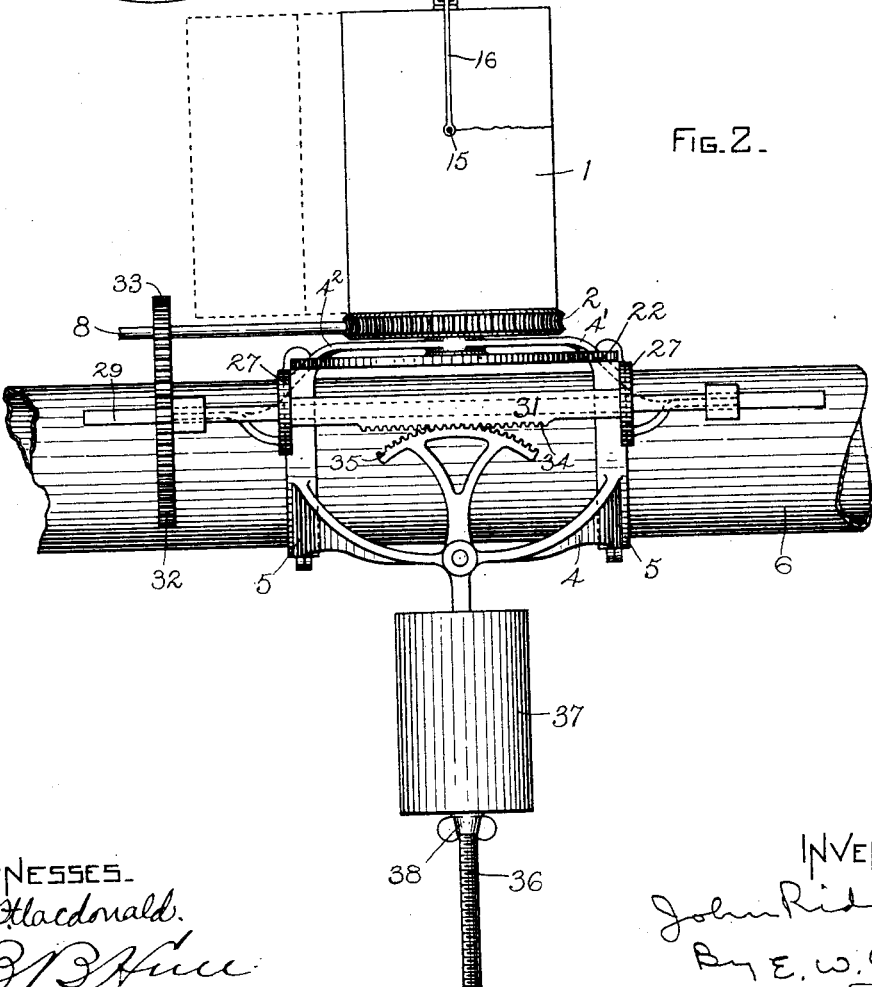

Referring to the accompanying drawings, in which similar figures of reference indicate like parts, Figure 1 shows the invention mounted on a bicycle. Fig. 2 is an enlarged view of the invention. Fig. 3 is a vertical section thereof. Fig. 4 is a plan view in horizontal section. Figs. 5 and 6 show, respectively, a detail in longitudinal and cross section and a modification of the invention.

As here shown applied to a bicycle, the apparatus embraces a revoluble cylinder 1, of sheet metal or other suitable material, having its lower end provided with a large horizontal worm-wheel 2, mounted to revolve on a vertical tubular bearing 3, which in turn is mounted on the branching frame 4, having arms 4' and 4², terminating in hinged rings 5, by means of which the apparatus is clamped to the upper bar of the bicycle-frame 6, as shown. Mounted in arms 7, projecting from a point at the union of the arms 4', is one end of a rotary shaft 8, having a worm 9, which meshes with the worm-wheel 2. The shaft 8 extends parallel for a certain distance with the upper bar of the bicycle-frame 6, and has its other end mounted in a bearing 10 on the bar 6.

The shaft 8 may be driven by any suitable connection with the running-gear of the vehicle, and, as here shown, is connected with the shaft of the sprocket-wheel 11 of the bicycle by means of an endless belt 12, passing over a pulley 13 on the shaft 8 and a pulley 14 on the shaft of the sprocket-wheel 11. It will be seen, therefore, that while the bicycle is in motion the cylinder 1 will be revolved by means of the worm-wheel 2, the worm 9, meshing therewith, the shaft 8, the pulleys 13 and 14, and the endless belt 12, all driven by the shaft of the sprocket-wheel 11. The exterior of the cylinder 1 serves as the supporting surface or base on which the outline to be delineated is to be marked out, it being clear that the marking may be done on the surface itself of the cylinder, which may be adapted to record a mark, and the cylinder may be so mounted on the wheel 2 as to be readily removed and a fresh cylinder substituted when the marking has reached the limit of a single cylinder, or, as in the illustration presented, a strip of paper may be used, which is wound upon a drum suitably mounted adjacent to the cylinder 1 and is connected to and wound upon the cylinder 1, as shown in dotted lines, Fig. 2, and the marking done on the paper as it is coiled upon the cylinder 1. In lieu of a cylinder other forms of base may be used.

15 indicates the marker shown in Figs. 2 and 3, which may be a pencil or other marking device located adjacent to and bearing against the surface to be marked. The marker 15 is mounted in any suitable manner, and, as here shown, is mounted on the lower end of an arm 16, having its upper bent end yieldingly connected, preferably by a hinge 17 and retaining-spring 18, to the upper end of an arm 19, projecting upward from and mounted on a nut 20, which is in turn mounted on a threaded vertical rod 21 in the cylinder 1, the lower end of the rod 21 projecting through the tubular bearing 3 and having secured to its end, projecting from the latter, a revoluble disk 22. The rod 21 is held up in place by means of a nut 23 thereon bearing against the upper end of the tubular bearing 3. Screwed on the upper end of the bearing 3 are a couple of rings or collars 24, located above the hub of the groove-wheel 2, and clamped between the rings 24 is the lower end of a vertical rod 25, extending through a projection 26 on the nut 20 and serving as a guide for the nut 20 to prevent it from turning on the rod 21. As thus far set forth, when the bicycle or other vehicle is in motion the cylinder 1 will keep revolving and a straight line will be marked on the circumference of the cylinder, or the paper thereon, by the marker 15. The distance traveled may be estimated from the line so marked by the ratio of the number of teeth in the wheel 2 relatively to the worm 9.

In order to delineate and record any irregularities either in elevations or depressions in the outline of the path, a device is employed in connection with the recording apparatus thus far described constructed in any suitable way and, for example, as shown in the following:

Adjacent to the periphery and on opposite sides of the disk 22 are located two small revoluble disks 27, mounted on and connected together by a tubular shaft 28, which in turn as mounted and splined to a shaft 29 by a spline 30, the shaft 28 being inclosed in a sleeve 31, all as shown in Fig. 5, and the sleeve 31 extending between the disks 27, as shown in Fig. 2. The shaft 29 has its bearings in the ends of the arms 42, and is provided with a gear-wheel 32, which meshes with a gear-wheel 33 on the shaft 8, so that when the bicycle is in motion the disks 27 are continually in motion by the shaft 8 imparting motion to the shaft 29. The sleeve 31 is provided with teeth 34, engaging the toothed quadrant 35, pivoted to the frame 4, and having the depending arms 36, provided with the weight 37, adjustable on the arm 36 by means of a wing-nut 38. While the bicycle is on a level road the weight 37 remains in the vertical position shown in Fig. 2 and both the disks 27 are out of contact with the disk 22. Now if the bicycle in traveling ascends or descends a hill or moves over a hollow or other irregularity in the path traveled the frame 6, as it is tilted from the horizontal, will cause the weight 37 to swing in one or the other direction from its normal perpendicular position and act on the toothed segment or quadrant 35 to move the sleeve 31 in one direction or the other, thereby moving one of the disks 27 into frictional engagement with the disk 22, this movement of the sleeve 31 being permitted by the tubular shaft 28 being splined to the shaft 29, with which the disks 27 rotate, motion being imparted to the disk 22 in one direction or the reverse, according as one or the other of the disks 27 is engaged with the disk 22, and motion is imparted by the latter to the rod 21, and the nut 20 is caused to ascend or descend on the latter, as the case may be, thereby raising or lowering the marker 15, and such is the responsive action of the latter to the swinging movement in one direction and the other of the weight 37 that the outline made by the marker 15 will correspond exactly with the irregular outline of the path traveled over, whether it be an incline upward or downward or hollows or other irregularities in the surface traveled over, as indicated by the irregular line in the surface of cylinder 1, Fig. 2.

As before stated, the length of the line traced by the marker 15 will be on such a scale that the grade and distance traveled can be accurately measured and computed.

In the form of the invention hereinbefore described the distance recorded by the marker 15 would be limited only by the length of the roll of paper. To eliminate the objectionable feature in the roll of paper and where only a comparatively short distance is desired to be recorded, a modification of the invention is provided, as shown in Fig. 6, in which the paper is not fed to the cylinder 1, as in Fig. 1, but instead the paper is mounted on the cylinder 1 and the marker is differently arranged and operated, so that the marker has a vertical movement, and a spiral line is traced on the marking-surface upward, as indicated in Fig. 6.

The objectionable feature above referred to as to the roll of paper is as follows: As the paper winding on the cylinder 1 increases the line recorded would not on that account accurately indicate the distance traveled, and to compensate for this the paper must be so scaled as to give an accurate reading.

In the modification a marker 15 is secured to a collar 39, mounted on a threaded vertical rod 40 adjacent to the cylinder 1 and extending at its upper end through a nut 41, mounted on the end of a bent arm 42, which projects out of the cylinder 1 and has at its lower end a nut 43, engaging the threaded rod 21. A vertical guide-rod 44, similar to the guide-rod 25, extends freely through the arm 42 and is mounted at its lower end on a bracket 45 of a plate or ring 46, mounted on the tubular bearing 3 and held by the nut 47. The frame 4 is provided with an arm 48, at the outer end of which is a bearing 49, inclosed in which, by a plate 50 and bolt 51, is a pinion 52, meshing with the grooved toothed wheel 2. The threaded rod 40 is provided at its lower end with an extension in the form of a smaller rod 53, which extends through the pinion 52 and engages therewith by means of a spline 54, as shown in Fig. 6, whereby the rod 53 is adapted to turn with the pinion 52 and also to move vertically through the latter. The collar 39 is held from turning by a vertical guide-rod 55, mounted on the nut 39 and extending through the nut 41. The operation of this modified construction is as follows:

As the bicycle or other vehicle proceeds the pinion 52 is rotated by the grooved gear-wheel 2, and movement is imparted from pinion 52 to rods 53 and 40, causing the collar 39 to slowly travel up with the rod 40, the marker 15 making a line on the paper, following the direction of a spiral to the top of the cylinder 1 as the latter revolves. Now as the vehicle passes over irregular surfaces the marker 15, by the action of the weight 37 and mechanism connecting it with nut 43, makes an irregular line on the paper.

It will readily be seen that when an ascent or descent is passed over and one or the other of the disks 27 is engaged with the disk 22 the action of the threaded rod 21 on the nut 43 is such that the arm 42, the nut 41, the rod 40, and the collar 39 are raised or lowered together, as the case may be, which is permitted by the spline connection of the extension-rod 53 with the pinion 52, the rod 53 sliding freely through the latter. The relative size and pitch of the threads of the rods 21 and 40 and the relative size and number of teeth of the wheel 2 and pinion 52 are such that the upward or downward movement of the nut 43 will raise or lower the rod 40, nut 41, and collar 39 and the marker 15 together, thereby marking an irregular outline, while at the same time it follows a spiral direction on the marking-surface. When the limit of marking is reached or the line marked has reached the top of the marking-surface on the cylinder, the marker and its parts may be quickly and readily moved back to their original position, the nuts 43 and 41 being formed as clamp-nuts, and, being unclamped, may be slid down the rods 21 and 40, respectively, to their original position. When the line of travel has been marked out, the paper may be removed and a fresh one substituted.

It will be noticed that according as the grade varies the weight 37 will shift from one perpendicular position to another, thereby causing the friction-disk 27, which is in engagement with the disk 22, to be moved nearer to or farther from the center of the latter as the grade changes and thereby accurately indicating by the line drawn the angle of the grade. As the contacting disk 27 is brought nearer to the center of the disk 22 by the tilting of the machine and the action of the weight 37 the speed of the disk 22 will correspondingly increase and move faster, so that the nearer the center of the disk 22 the disk 27 is the faster the disk 22 will move and the sharper will be the angle of the outline, and the farther from the center of the disk 22 the disk 27 is the slower will be the speed of the disk 22 and the less will be the grade outlined.

While the invention has been set forth as constructed and operated in a particular way, I do not limit myself thereto, as various changes and forms may be employed which will accomplish the same result. The invention, instead of being mounted on a vehicle, may be mounted on a wheeled frame or in any other suitable manner, so as to be moved over a path by hand. Outlines and measurements of a path traveled over may be quickly and accurately obtained at less time, expense, and labor than to survey the same in the ordinary way.

Having described my invention, I claim—

1. A path delineating, measuring and recording apparatus, adapted to be mounted upon a vehicle and operated by the running-gear of the latter, and consisting of a revoluble recording-surface, a marker adjacent to said surface, mechanism connected with and operating the revoluble recording-surface and driven by the movement of the vehicle, mechanism normally at rest and connected with said marker to operate the same, and mechanism normally out of gear with the marker-operating mechanism, and connected with and operated by the recording-surface mechanism, and thrown into gear with the latter when the apparatus is tilted endwise, as herein set forth.

2. In a path delineating, recording and measuring apparatus, a supporting-frame, having mounted thereon a revoluble recording-surface, a mechanism for rotating the recording-surface, a marker bearing against the recording-surface, a mechanism normally at rest, connected with the marker and adapted to move the marker above or below its normal position, and a mechanism normally out of connection with the marker-operating mechanism, and adapted to be thrown into connection with the marker raising or lowering mechanism by the tilting of the supporting-frame of the several parts, as set forth.

3. In a path delineating, recording and measuring apparatus, a supporting-frame having mounted therein a movable base or support having a recording-surface, mechanism for operating the movable recording-surface support, a marker bearing against the recording-surface, a mechanism normally at rest and adapted to raise or lower the marker from its normal position, a mechanism normally out of gear with the marker-operating mechanism and a weighted pendulum connected with the said mechanism out of gear with the marker-operating mechanism, and operating by the tilting of the aforesaid supporting-frame to connect the said mechanisms together and move the marker from its normal position, as set forth.

4. The combination with a vehicle, of a path delineating, recording and measuring apparatus, consisting of a supporting-frame mounted on said vehicle, a revoluble cylinder mounted on said frame, a mechanism operating said cylinder and connected with the driving-gear of the vehicle, a vertical screw-shaft normally at rest, a nut mounted on said shaft and held from turning thereon, a marker bearing against the recording-surface of the cylinder and mounted on a support projecting from said nut, a disk at the bottom of said vertical screw-shaft, a mechanism connected with the driving mechanism of the vehicle and normally out of gear with the disk of the vertical screw-shaft, and a weighted pendulum connected with said mechanism, by means of which, when the vehicle is tilted endwise, said mechanism is moved into gear with the wheel of the vertical screw-shaft and the marker is moved above or below its normal position, as set forth.

5. In a path delineating, recording and measuring apparatus, adapted to be driven over the earth's surface, a revoluble recording-surface, mechanism for operating said recording-surface, a vertical screw-threaded rotary shaft, normally at rest and having a nut mounted thereon, a second screw-threaded shaft having a nut mounted thereon, and connected with and operated by the recording-surface mechanism, an arm connecting the latter nut with that on the first screw-threaded shaft, mechanism automatically movable into connection with the first screw-threaded shaft to drive the latter in one direction or the other as the apparatus is tilted, and a marker bearing against the recording-surface, and mounted on the second screw-threaded shaft, and raised and lowered with the latter as the nut on the first screw-threaded shaft is raised or lowered, as set forth.

6. A path delineating, recording and measuring apparatus, adapted to be mounted on a vehicle, said apparatus embracing a revoluble cylinder serving as a support for a recording-surface, a marker in fixed relation to said cylinder, a mechanism driven by the vehicle, and operating the said cylinder, and a mechanism connected with the driving mechanism of the vehicle and automatically movable into connection with the marker, and moving the marker to indicate the irregular outline of the path traveled over, said marker being also moved vertically to mark the outline of the path in a spiral direction on the recording-surface, and means for releasing said marker when it has reached the top of the cylinder and permitting it to be moved back to a position at the bottom of the cylinder, as set forth.

7. A path delineating, recording and measuring apparatus to be mounted on a vehicle, said apparatus consisting of a revoluble recording-surface, a mechanism driven by the vehicle and operating the recording-surface, a vertical screw-threaded shaft in proximity to said recording-surface, and having a horizontal disk-wheel on its lower end, said shaft and disk being normally at rest, a nut on said shaft adapted to travel on the latter, an arm on said nut having a nut at its outer end, a vertical screw-threaded shaft adjacent to said recording-surface and projecting through said second nut, a marker mounted on said last-named shaft and movable vertically therewith, said shaft being geared with the recording-surface to have a rotary movement and also an independent vertical sliding movement, a pair of vertical friction-disks adjacent to the periphery of and normally out of engagement with the said horizontal disk-wheel and mounted on a shaft driven by the main driving mechanism, and also connected by a sleeve movable endwise on said shaft, said sleeve having rack-teeth, and a toothed segment having a depending arm and weight, whereby as the entire apparatus tilts endwise when the vehicle passes over irregular surfaces one or the other of said friction-disks is moved by the action of the weight into engagement with the horizontal disk and causes the marker to be raised or lowered to delineate irregular surfaces of the path, as set forth.

8. A path delineating, recording and measuring apparatus, comprising a movable recording-surface, a marker, mechanism for operating the marker, and mechanism normally out of engagement with and movable into engagement with the marker mechanism when the apparatus is tilted endwise, and also automatically adjustable in engagement with the marker mechanism to increase or decrease the speed of the latter as the apparatus is tilted endwise, as herein set forth.

In witness whereof I have hereunto set my hand this 21st day of September, 1896.

JOHN RIDDELL.

Witnesses:
   PERCY T. M. BECKETT,
   GEO. C. REILLEY.